United States Patent [19]

Kato et al.

[11] Patent Number: 5,274,633
[45] Date of Patent: Dec. 28, 1993

[54] SWITCHING SYSTEM FOR ATM DUAL SWITCH SYSTEM

[75] Inventors: Yumiko Kato, Soka; Satoshi Kakuma, Kawasaki; Yasuhiro Aso, Tokyo; Yoshihiro Uchida; Hiroshi Miyake, both of Kawasaki, all of Japan

[73] Assignee: Fujitsu Limited, Kawasaki, Japan

[21] Appl. No.: 730,808

[22] PCT Filed: Nov. 29, 1990

[86] PCT No.: PCT/JP90/01556
§ 371 Date: Jul. 29, 1991
§ 102(e) Date: Jul. 29, 1991

[87] PCT Pub. No.: WO91/08632
PCT Pub. Date: Jun. 13, 1991

[30] Foreign Application Priority Data

Nov. 29, 1989 [JP] Japan .................. 1-310075

[51] Int. Cl.$^5$ .............................................. H04J 3/02
[52] U.S. Cl. .................................... 370/60; 370/16; 370/94.1; 371/8.1
[58] Field of Search ............ 370/16, 80, 91, 92, 370/60, 94.1; 371/8.1

[56] References Cited

U.S. PATENT DOCUMENTS 4,228,535  10/1980  Workman et al. ................ 370/16
5,072,440  12/1991  Isono et al. ...................... 370/60

FOREIGN PATENT DOCUMENTS 0321050  6/1989  European Pat. Off. .

OTHER PUBLICATIONS

Globecom '84, Atlanta, Georgia, Nov. 26-29, 1984, vol. 1, IEEE, New York, "Packet Switching in N Log N Multistage Networks", pp. 114-120.
Globecom '88, Hollywood, Florida, Nov. 28-Dec. 1, 1988. IEEE, New York, "A Second Generation Prototype for Broadband Integrated Access and Packet Switching", H. E. Bussey et al., pp. 1266-1271.
Patent Abstracts of Japan, vol. 009, No. 147 (E-323), Jun. 21, 1985; & JP-A-60 027 256 (Hitachi Seisakusho K.K.) Feb. 12, 1985 *Abstract*.
Patent Abstracts of Japan, vol. 014 No. 079 (E-888), Feb. 14, 1990; & JP-A-1 292 936 (Hitachi) Nov. 27, 1989 *Abstract*.

Primary Examiner—Douglas W. Olms
Assistant Examiner—Russell Blum
Attorney, Agent, or Firm—Staas & Halsey

[57] ABSTRACT

The present invention relates to a system switching system in an exchange system in which an ATM switch for exchanging asynchronous transfer mode (ATM) cells is duplexed. In order to switch between ATM switches accurately with drop-out and overlap of cells eliminated, at the input side of the ATM switches, a bit indicating active is inserted into the header of a cell from a transmission line for application to the switch in the active system and a bit indicating standby is inserted into the header of a cell for application to the switch in the standby system and, at the output side of the ATM switches, bits in the headers of cells output from respective switches are referred to and only active indicating cells are selected to be output to a transmission line. Buffers for storing active indicating cells are provided at the outputs of the ATM switches, respectively. At the time of switching between systems, cell input to the old active system is stopped, active indicating cells are stored in the buffer in the active system, and active indicating cells stored in the buffer in the new active system are output after all the active indicating cells in the old active system have been output.

9 Claims, 16 Drawing Sheets

○∼ ... HIGHWAY SOURCE   [BUF] ... BUFFER   ⊕ ... MULTIPLEXER

| ATM SWITCH #0 | ATM SWITCH #1 | ACT CONTROLLER GENERATION INFORMATION | |
|---|---|---|---|
| ACT | ACT | HOLD PREVIOUS | STATE |
| ACT | SBY | #0 ACT | #1 SBY |
| SBY | ACT | #0 SBY | #1 ACT |
| SBY | SBY | HOLD PREVIOUS | STATE |

FIG. 11

| BUFFER #0 | BUFFER #1 | SELECTOR CONTROL |
|---|---|---|
| EMPTY | EMPTY | PREVIOUS STATE |
| EMPTY | HAVE DATA | FROM BUFFER #1 |
| HAVE DATA | EMPTY | FROM BUFFER #0 |
| HAVE DATA | HAVE DATA | PREVIOUS STATE |

FIG. 18

| 0 SYSTEM | 1 SYSTEM | SELECTION STATE |
|---|---|---|
| ACT | ACT | HOLD PREVIOUS STATE |
| ACT | SBY | 0 SYSTEM |
| SBY | ACT | 1 SYSTEM |
| SBY | SBY | HOLD PREVIOUS STATE |

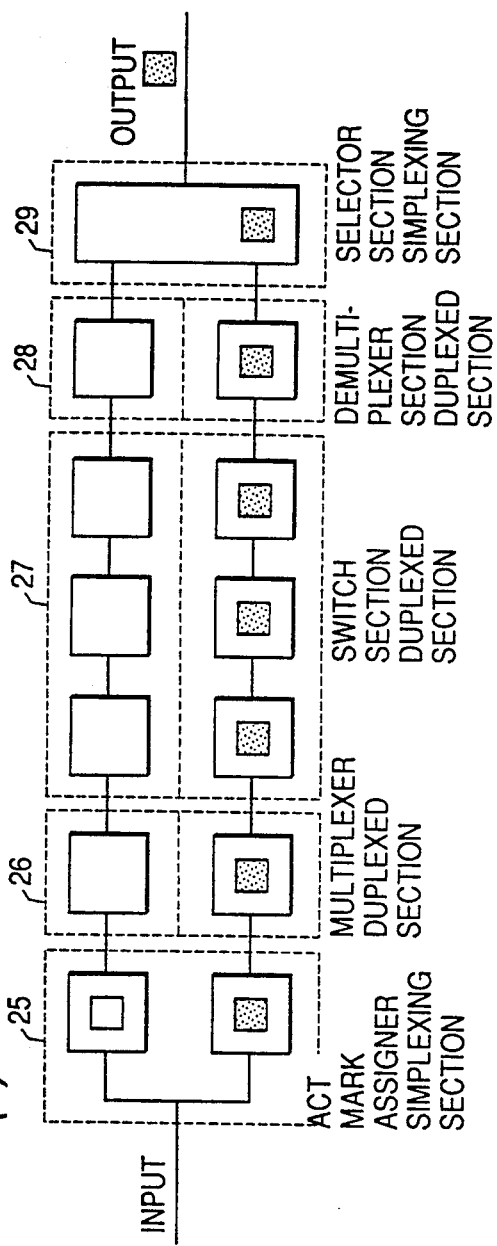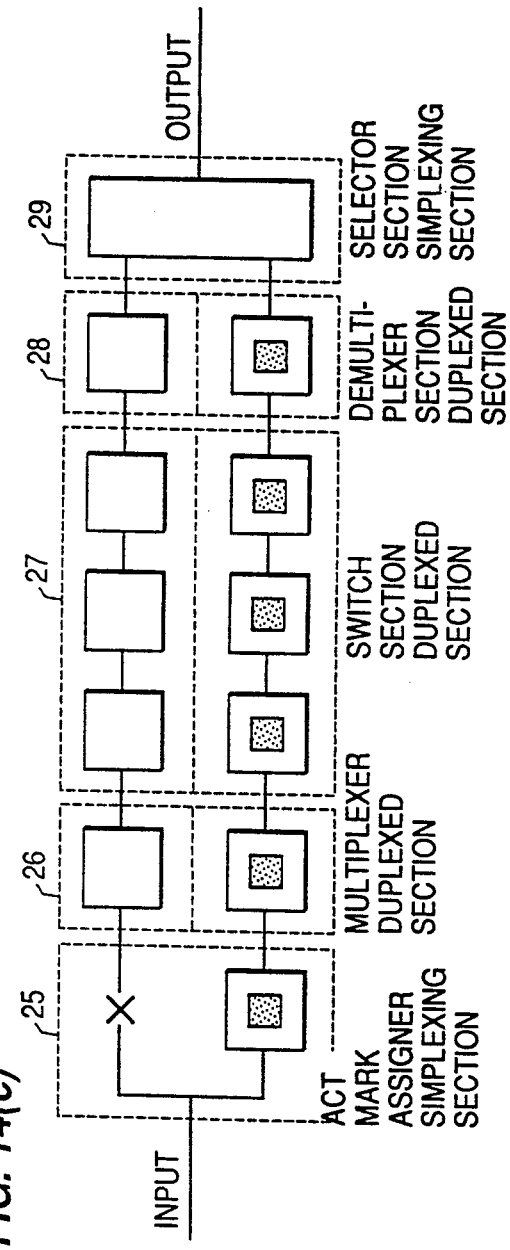

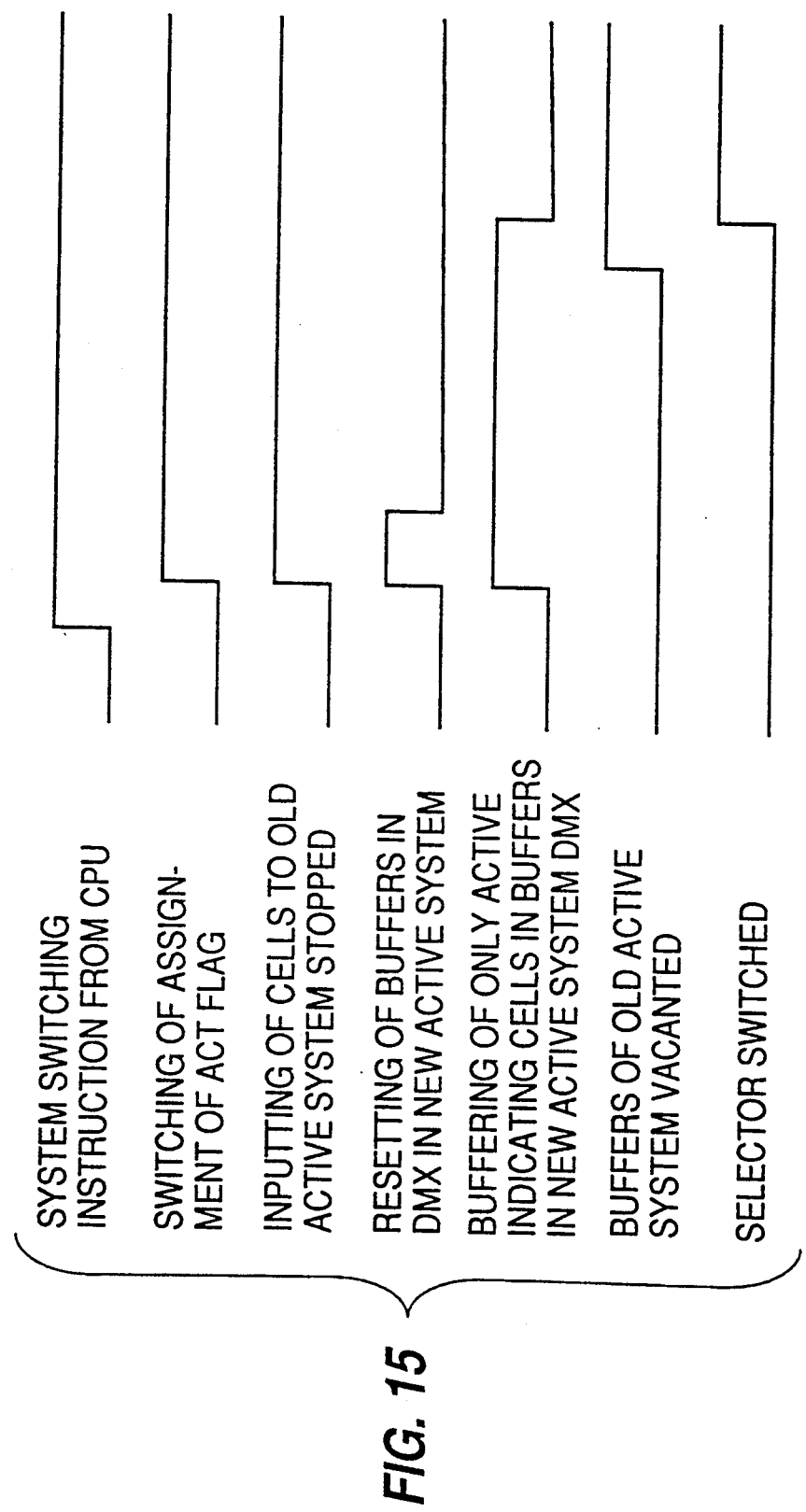

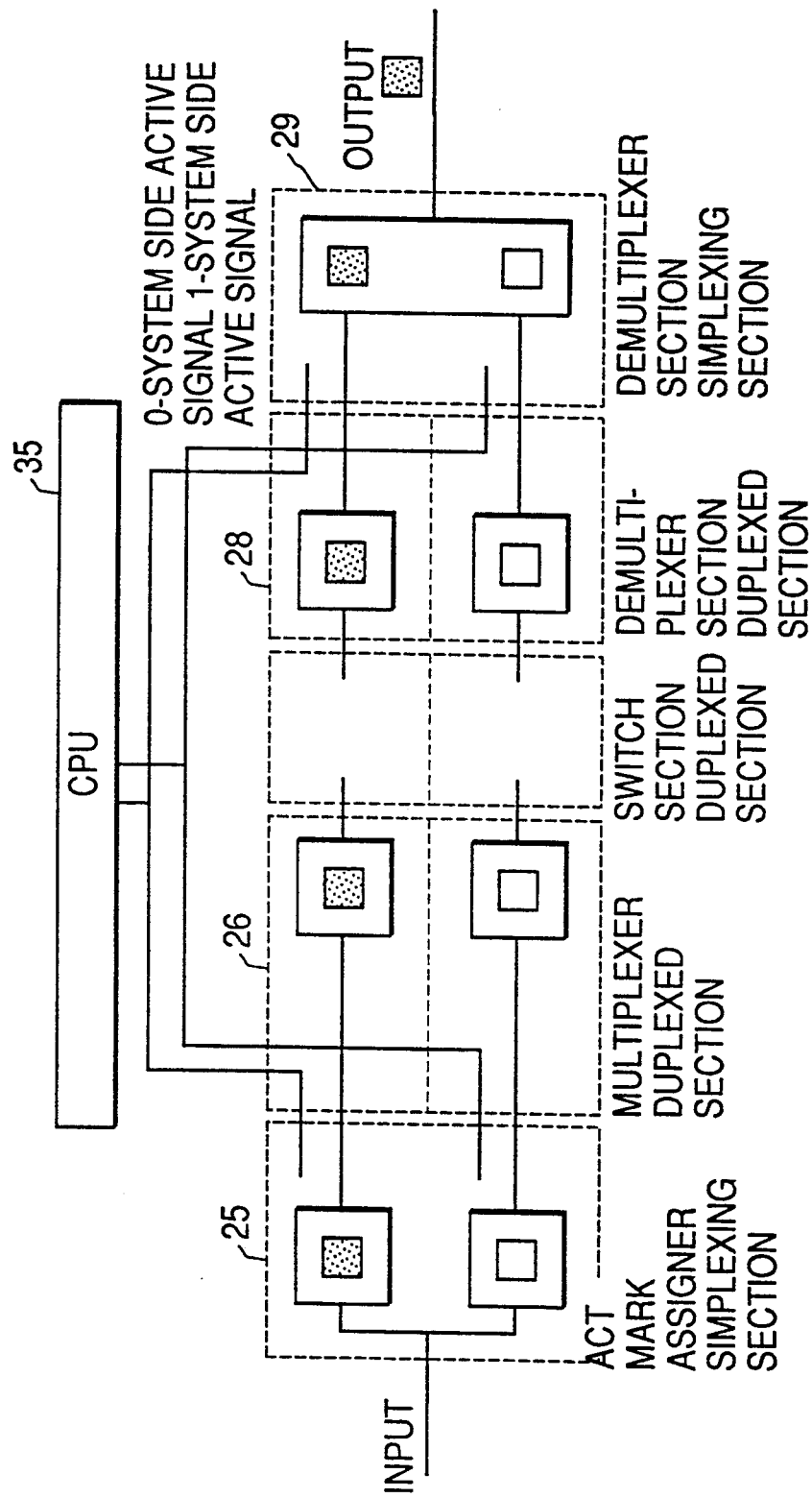

5,274,633

SWITCHING SYSTEM FOR ATM DUAL SWITCH SYSTEM

BACKGROUND OF THE INVENTION

The present invention relates to a system for switching between systems in an exchange system in which an ATM switch is duplexed.

An ATM (Asynchronous Transfer Mode) network, unlike a conventional STM (Synchronous Transfer Mode) network, exchanges and transmits information with information to be transmitted being entered into an information element of a given length which is referred to as a cell. The cell, as shown in FIG. 1, is composed of a header for identifying a virtual channel and information containing actual information.

The ATM switch performs routing within the switch on the basis of the contents of the header. Thus, the transfer time of a cell varies with the route. In a duplexed ATM switch as well, the transfer time of a cell varies with its internal state even if the same route is set.

FIG. 2 illustrates the system configuration of a conventional duplexed (redundant) system. ATM data from a transmission line 1 is entered into a transmission line interface 2. The transmission line interface 2 distributes signals to duplexed ATM switches 3 and 4 equally. In both of the duplexed ATM switches 3 and 4, the same routing is performed.

A transmission line interface 5 on the output side receives cells from one of the ATM switches 3 and 4 that is in the active state and sends them out onto a transmission line 6.

FIG. 3 illustrates an example of an arrangement of the ATM switch (n×m cross switch). In this Figure, the ATM switch is adapted to output a cell from one of n input highways to one of m output highways.

In FIG. 3, the ATM switch is comprised of buffers 7 each of which is placed at an individual one of intersections of the input highways and the output highways, multiplexing sections 8 and highway sources 9 each corresponding to a respective individual output highway. Each of the highway sources 9 is adapted to output a bit indicating whether or not data is present on a corresponding channel, and each of the multiplexers 8 is adapted to capture an empty channel and insert a cell to be switched into the channel.

FIG. 4 illustrates a conventional duplexed system in which ATM switches are connected in multistages. In the Figure, ATM switches (cross switches) are connected in three stages. One of the outputs of both of the multistage-connected switches is selected by a system selector and then output onto a transmission line.

With the duplexed system using ATM switches shown in FIG. 2, however, since the transfer times of cells differ from each other even if the same route is set in the ATM switches 3 and 4, if the receiving-side transmission line interface 5 makes system switching by means of selection of cells, drop-out of cells and overlap between cells will occur. Thus, there is a disadvantage that systems cannot be switched without affecting call processing.

As described in connection with FIG. 3, there are provided buffers 7 for contention control in the ATM switch. If, for example, the power supply of one of the systems is turned off for maintenance and turned on again at the termination of the maintenance, a difference will arise between this system and the other system which has continued its operation in respect of data storing states of the buffers in the switches. Thus, there is a problem that drop-out, overlap and overstripping of cells occur if the systems are switched as they are.

SUMMARY OF THE INVENTION

In view of the above problems of the prior art, it is the object of the present invention to provide a switching system for an ATM switch duplexed system which allows accurate switching to be made between ATM switches so that drop-out of cells and overlap between cells will not occur.

FIG. 5 is a functional block diagram of a first system switching system. The figure is a functional block diagram of a first system switching system adapted to insert into an ATM cell a bit indicating that a system is active or on standby and enter it into an exchange.

In FIG. 5, at the input side of the exchange, in block 10, an AI bit indicating that the system is active is inserted into the header of a cell from a transmission path to the switch in the active system and a bit indicating that the system is on standby is inserted into a cell to the switch in the standby system and entered into the exchange. At the output side of the exchange, in block 11, by referring to the AI bit in the header of each cell output from each of two ATM switches, cells each indicating that its AI bit is active are selected and sent out onto a transmission path.

In the first switching system, there are provided two buffers, each of which stores a cell output from a corresponding one of ATM switches, between the ATM switches and a selector for selecting a cell and outputting it to a transmission path. At the time of switching between the active system and the standby system, entry of cells into the ATM switch of a system which was active is stopped, and only cells indicative of being active are stored in the buffer at the output side of the ATM switch of the system which was on standby. At a point of time when cells indicative of being active disappear from the buffers within the ATM switch of the system which was active and the buffer at the output side of the ATM switch, the selector starts to output cells from the buffer of the system which was on standby, thereby allowing the ATM switches to be accurately switched without causing drop-out of cells and overlap between cells.

FIG. 6 is a block diagram illustrating the principle of a second system switching system. This figure is a block diagram illustrating the principle of a second system switching system for switching between systems without providing an ATM cell with a bit indicating that a system is either active or on standby.

In FIG. 6, two cell storage means 12 and 13 are, for example, buffers for storing input ATM cells and provided at the input sides of a transmission line to two ATM switches 14 and 15. A system selecting means 16 is adapted to select either of outputs of the two ATM switches 14 and 15 and output it to a transmission line.

In FIG. 6, at the time of switching between systems, outputting of cells from the cell storage means 12 and 13, e.g., buffers, to corresponding ATM switches 14 and 15, is stopped and input ATM cells are stored in the buffers. When residual cells disappear from the ATM switches, the stop applied to outputting of cells from the buffers is canceled and the system selecting means is switched. That the ATM switches have no residual cells can be decided by detecting that the buffers provided at intersections of the input highways and the output highways, which were described in connection with FIG. 3, are all vacated.

BRIEF DESCRIPTION OF THE DRAWINGS

FIG. 11 is a diagram illustrating the control of the selector by the selector controller;

FIGS. 14(a), 14(b), 14(c) and 14(d) are diagram for explaining the switching operation in the second embodiment;

FIG. 15 is a timing chart of the system switching process in the second embodiment;

FIG. 17 is a diagram illustrating the position of the central processing unit of the exchange system in the second embodiment;

FIG. 18 is a diagram illustrating select states of the selector in the second embodiment;

DESCRIPTION OF THE PREFERRED EMBODIMENTS

The present invention will be described in more detail with reference to the accompanying drawings.

Figure 4:
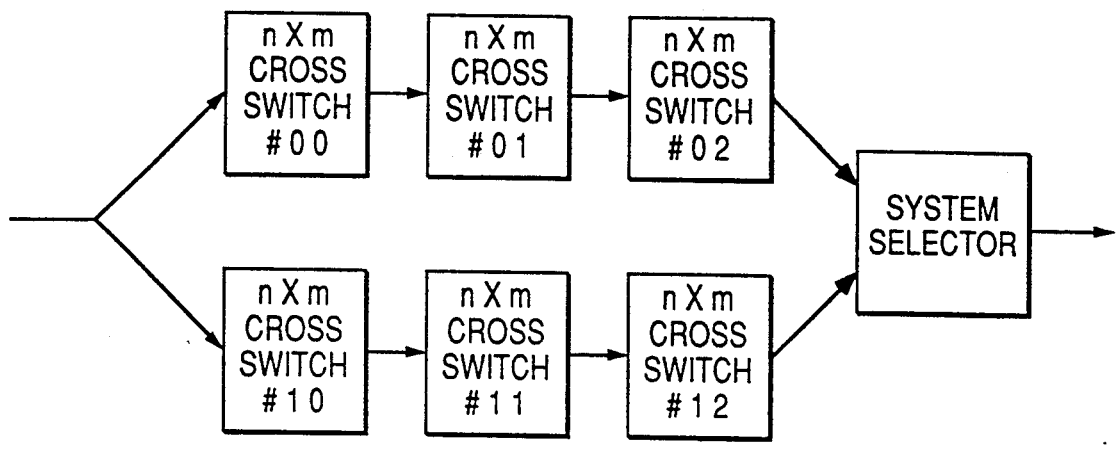
FIG. 4 illustrates a conventional duplexed system in which the cross switches are connected in multistages.
Figure 5:
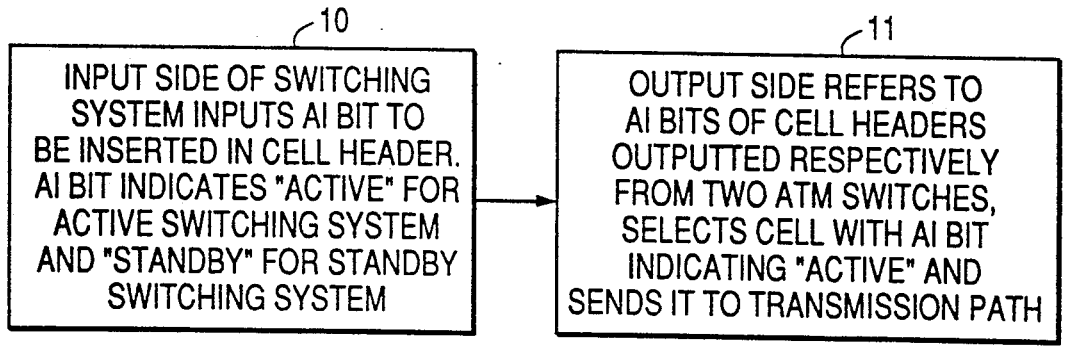
FIG. 5 is a functional block diagram of a first switching system.
Figure 6:
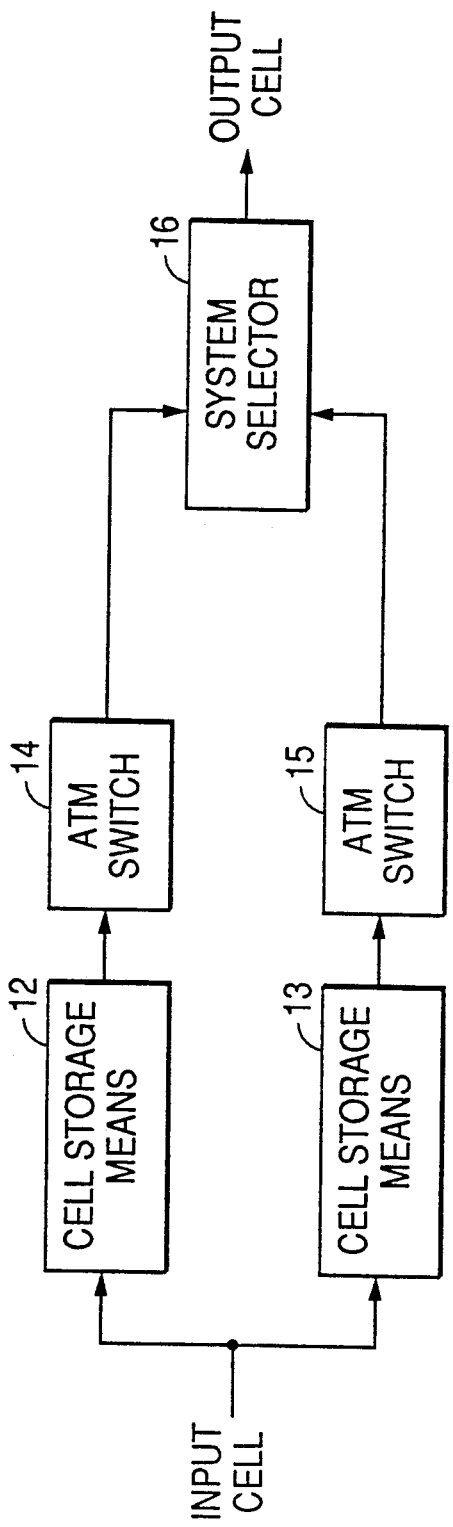
FIG. 6 is a block diagram illustrating the principle of a second switching system.
Figure 7:
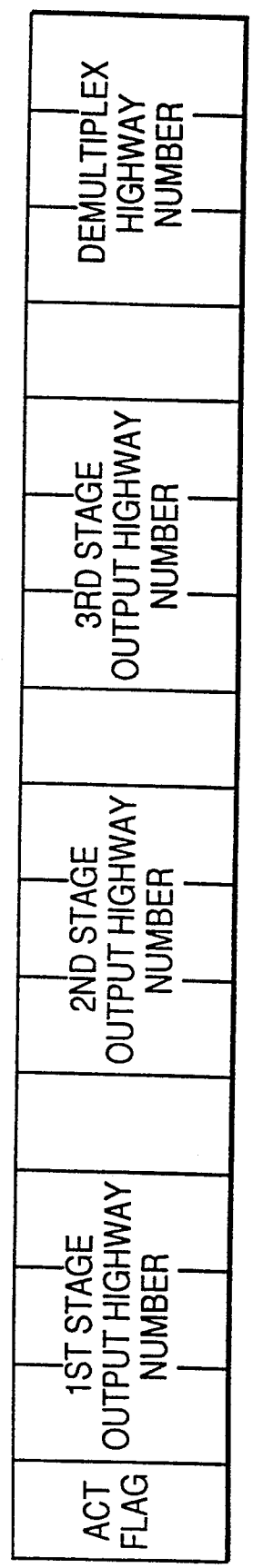
FIG. 7 is a diagram illustrating an embodiment of a position into which an active/standby indicating bit is inserted.

FIG. 7 illustrates an embodiment designating a position into which an active/standby indicating bit, which is assigned to the header part of an ATM cell, is inserted in order to indicate that the system is active or on standby. In the figure, an ACT flag serving as the active/standby indicating bit is inserted into a free area of TAG information, which is generally assigned to the header part of a cell at the time of entry into an exchange for exchange control in the exchange, for example, bit position 0. Bit 0=1 indicates active, while bit 0=0 indicates standby. In the TAG information are stored an output highway number for each of the cross switches connected in, for example, three stages as indicated in FIG. 4, and a highway number for a demultiplexer for outputting a cell onto one of plural transmission lines, which is not shown in FIG. 4.

Figure 1:
FIG. 1 is a diagram illustrating an arrangement of an ATM switch.
Figure 2:
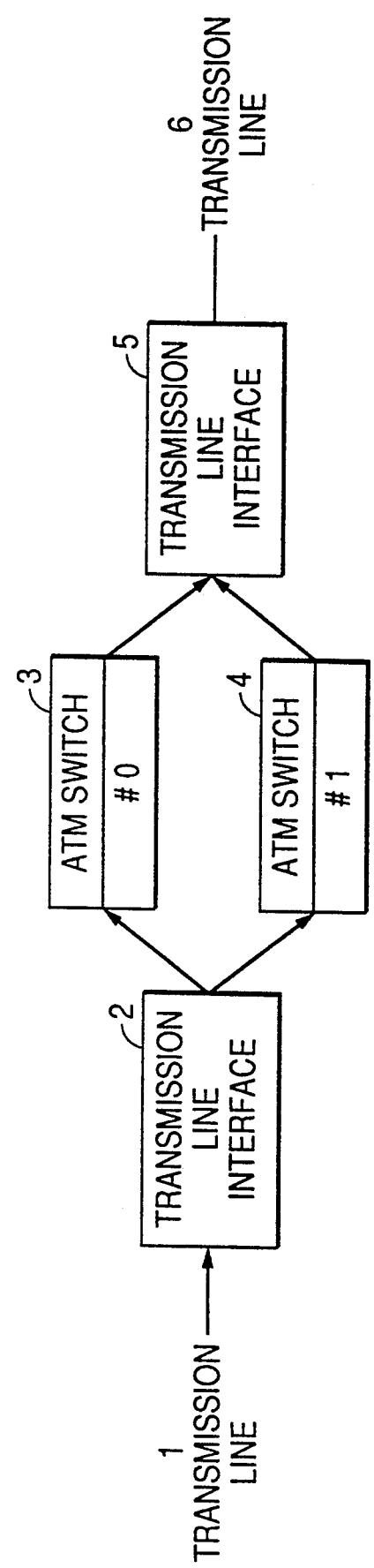
FIG. 2 is a diagram illustrating a system configuration of a conventional ATM switch duplexed system.
Figure 3:
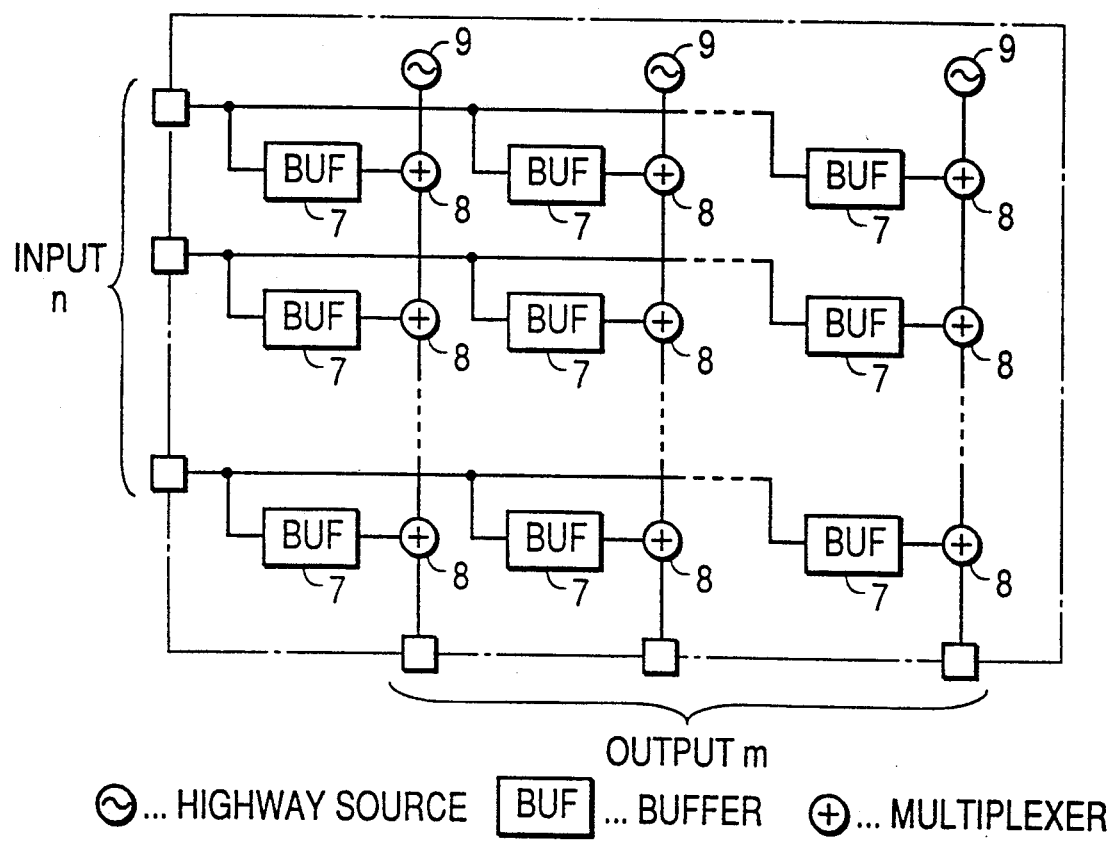
FIG. 3 is a block diagram illustrating an example of an arrangement of an n×m cross switch.
Figures 8, 9:
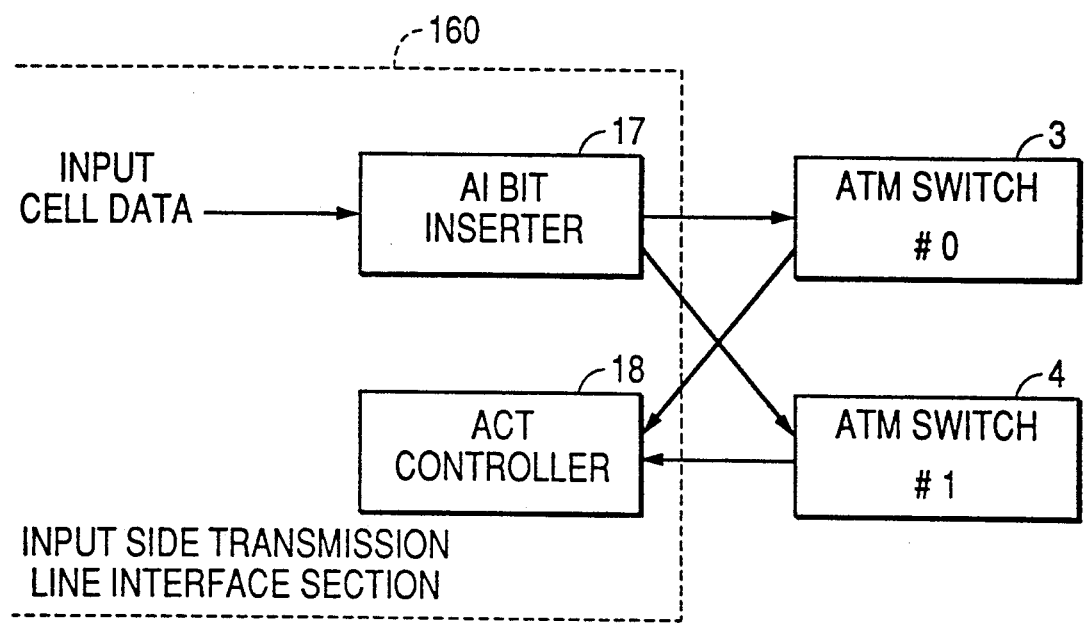
FIG. 8 is a block diagram illustrating an arrangement of an input-side transmission-line interface in a first embodiment of the ATM switch duplexed system.
FIG. 9 is a diagram illustrating an embodiment of ACT controller generating information.

FIG. 8 is a block diagram of a transmission line interface at the cell input side in a first embodiment of the ATM switch duplexed system. Like reference numerals, are used to designate corresponding parts to those in FIG. 2. In the figure, 160 designates the input transmission line interface section. Reference numeral 17 designates an AI bit inverter which receives cell data and inserts a bit (AI bit) indicative of being active into the header of a cell to be entered in the active system and a bit indicative of being on standby into a cell to be entered into the standby system, and 18 designates an ACT controller which is responsive to information from duplexed ATM switches 3 and 4 to control the operation of the AI bit inserter 17. The AI bit inserter 17 and the ACT controller 18 are contained in the input transmission line interface section 160. The operation of the circuit constructed in this way will be explained as follows.

The ATM switches 3 and 4 constituting the duplexed system can assume either the active (ACT) mode or the standby (SBY) mode. Mode information of the ATM switches 3 and 4 is applied to the ACT controller 18. The ACT controller 18 is responsive to the mode information to generate such information as shown in FIG. 9.

That is, when the #0 ATM switch 3 is ACT and the #1 ATM switch 4 is ACT, such information as to retain or hold the previous state is generated. When the #0 ATM switch 3 is ACT and the #1 ATM switch 4 is SBY, such information as renders #0 ACT and #1 SBY is generated. When the #0 ATM switch 3 is SBY and the #1 ATM switch 4 is ACT, such information as renders #0 SBY and #1 ACT is generated. When the #0 ATM switch 3 is SBY and the #1 ATM switch 4 is SBY, such information as to retain the or hold the previous state is generated. Such information is applied to the AI bit inserter 17.

When, for example, the ATM switches #0, #1 are both ACT or SBY (such a state can occur at the time of switching between systems), the AI bit inserter 17 inserts into a cell an AI bit of the state it had before both of the switches became ACT. For example, when #0 is ACT and #1 is SBY, the AI bit inserter inserts an AI bit of ACT into a cell to the #0 switch and an AI bit of SBY into a cell to the #1 switch. When the #0 switch is ACT and the #1 switch is SBY, the bit inserter inserts an AI bit of ACT into a cell to the #0 switch and an AI bit of SBY into a cell to the #1 switch. The cells in which AI bits are inserted into their respective headers in this way are applied to the corresponding respective ATM switches 3 and 4 and the switching operation through the same route is performed.

Figure 10:
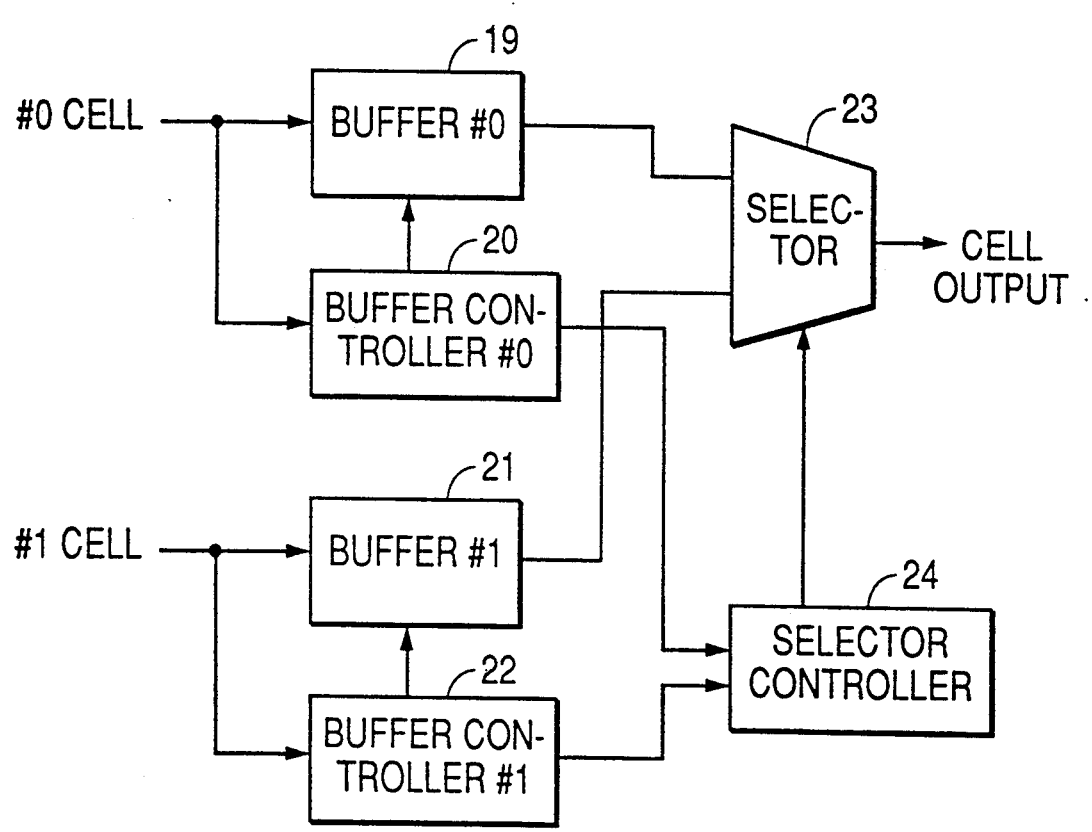
FIG. 10 is a block diagram illustrating an arrangement of an output-side transmission-line interface in the first embodiment.

FIG. 10 is a block diagram of a transmission line interface at the cell outputting side in the first embodiment of the ATM switch duplexed system. In the figure, 19 designates a buffer for receiving #0 cell data, 20 designates a buffer controller which refers to the AI bit contained in a #1 cell and writes the cell data into the buffer 19 only when the AI bit is ACT, 21 designates a buffer for receiving #1 cell data, and 22 designates a buffer controller which refers to the AI bit contained in a #1 cell and writes the cell data into the buffer 21 only when the AI bit is ACT.

Reference numeral 23 designates a selector for selectively outputting one of outputs of the #0 buffer 19 and the #1 buffer 21 and 24 designates a selector controller which is responsive to output information (information for monitoring the presence or absence of data in the buffers 19 and 21) from the #0 buffer controller 20 and the #1 buffer controller 22 to perform select control of the selector 23. The operation of the circuit thus constructed will be described as follows.

The #0 and #1 buffer controllers 20 and 22 receive their respective cell data to refer to the AI bits inserted into their headers and write cell data transmitted only when the AI bits are ACT into their corresponding respective buffers 19 and 21. The buffer controllers 20 and 22 monitor the states of their respective buffers 19 and 21 to send to the selector controller 24 information about the presence or absence (empty) of data in the buffers 19 and 21. The selector controller 24 is responsive to the information about the states of the buffers 19 and 21 from the systems to control the selector 23 as indicated in FIG. 11.

That is, when both of the buffers #0 and #1 are empty or have data, the selector 23 is kept in the previous state For example, if the buffer #0 has been selected, its selected state is kept as it is. On the other hand, when either of the buffers #0 and #1 has data, the buffer with data is selected.

Next, the operation at the time of switching between systems will be described. At the time of switching between systems, on the input side, after the ACT/SBY for both systems have become stabilized, that is, after the #1 became ACT in FIG. 12(c) after the #0 became SBY in FIG. 12(b), the AI bit of ACT is inserted into the header of each of cells only for the system which has become ACT anew. On the output side, on the other hand, only cells whose AI bits are ACT are written into the buffers 19 and 21. For this reason, although cells whose AI bits are ACT and cells whose AI bits are SBY are transmitted mixed because of different internal states in the duplexed system, all the AI bits will eventually become SBY and the buffer will become empty in the new SBY system.

In the new ACT system, on the other hand, although cells whose AI bits are SBY and cells whose AI bits are ACT are mixed, all the AI bits will eventually become ACT. When the buffer of the new SBY system becomes empty, data is read from the buffer 19 or 21 under the control of the selector controller 24.

Figure 12:
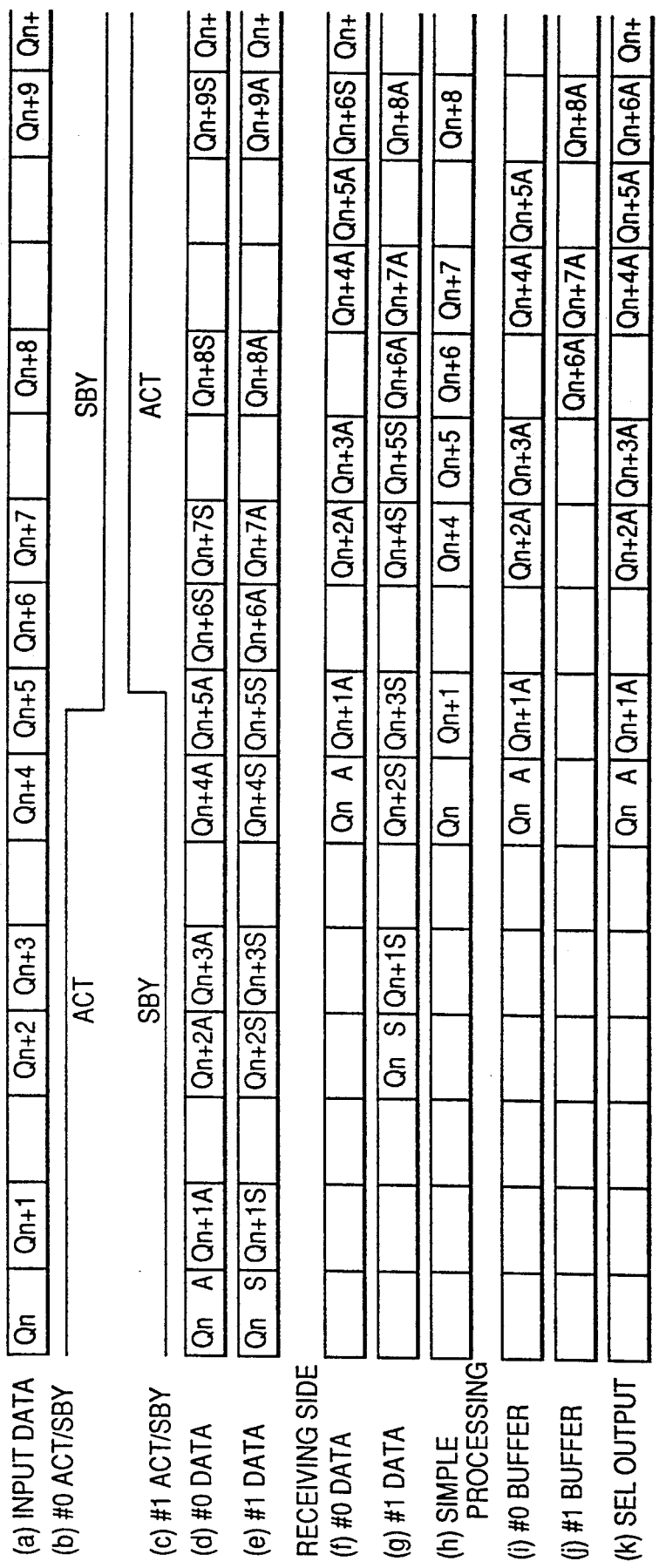
FIG. 12 is a timing chart of an exemplary operation at the time of switching between systems in the first embodiment.

FIG. 12 is a timing chart of the operation at the time of switching between systems. It is assumed that data is entered as indicated in (a) (in the figure blanks indicate vacancy of data). It is assumed here that the ACT/SBY of the #0 and #1 systems is set as indicated in (b) and (c). The AI bits are inserted into the headers of cells according to the ACT/SBY states indicated in (b) and (c). As a result, the ACT, SBY states of #0 data and #1 data will become as shown in (d) and (e) in the figure. Here, A indicated in data Q represents ACT, while S represents SBY.

Since, in the initial state, the #0 system is ACT (hereinafter indicated as A) and the #1 system is SBY (hereinafter indicated as S), #0 data becomes A and #1 data becomes S during this state. At the time of switching between systems (the timing of data Qn+5), the #0 system is in ACT and the #1 system is in SBY because the previous state is held.

Next, the operation of the output side will be described. In the process in the duplexed ATM switches, the #0 data arrive after a delay of six cells as indicated in (f), while the #1 data arrive after a delay of three cells as indicated in (g) because of different internal states.

Here, if arriving data indicated in (f) and (g) are selected by the use of the #0 and #1 ACT information irrespective of AI bits, the result will become as shown in (h). As is evident from the figure, data Qn+2 and Qn+3 are dropped out. The use of the buffer configured as shown in FIG. 10 in the output-side transmission line interface section allows only cells whose AI bits are ACT to be written into the buffers as indicated in (i) and (j).

For example, only data of ACT are written into the #0 buffer 19 as indicated in (i). On the other hand, into the #1 buffer 21 as well are written only data of ACT as indicated in (j). As to the #1 buffer, since the first ACT data is Qn+6, Qn+6 and following data are written into. Reading of data written into the buffers in this way is performed by the selector controller 24. In this case, reading of the data from the #1 buffer 21 is not performed until the #0 buffer 19 has become vacated. That is, the selector controller 24 selects the #0 buffer 19 until the #0 buffer 19 has been vacated, in other words, until the last data Qn+5 has been read. Note that it is assumed here that the #1 buffer is read after active cells of buffers placed at intersections in the ATM switch, i.e., n×m cross switch have disappeared.

As a result, the contents of the #0 buffer 19 up to the data Qn+5 are output from the selector 23 as indicated in (k). It is not until the #0 buffer 19 has been vacated that the selector controller 24 switches the selector 23 to select the #1 buffer 21, so that the contents Qn+6, Qn+7 of the #1 buffer 21 are output from the selector 23. In this way, as indicated in (k), successive data are read at the time of switching between systems without causing drop-out of data cells and overlap between cells.

Figure 13:
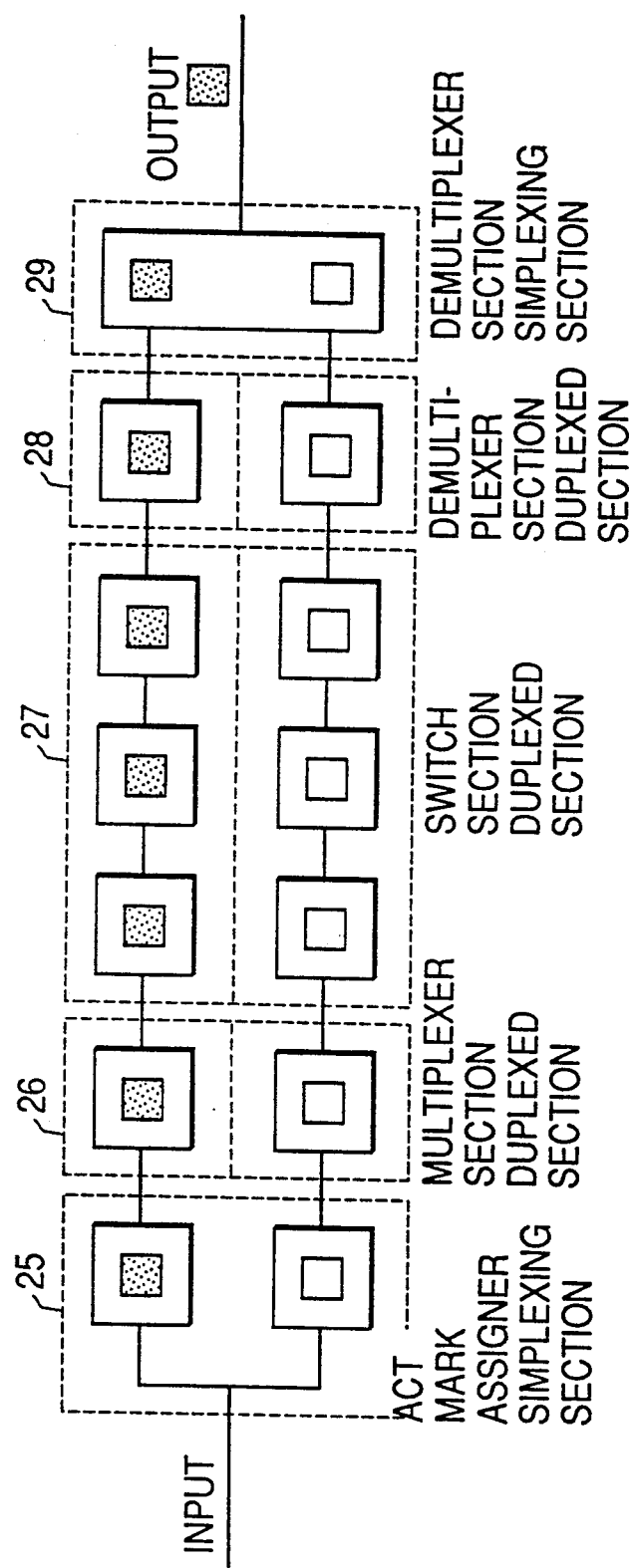
FIG. 13 is a block diagram illustrating a second embodiment of the ATM switch duplexed system.

FIG. 13 is a block diagram of a second embodiment of the ATM switch duplexed system. In the figure, the system is constructed from an ACT mark assigner section 25 for setting an ACT flag indicating active to the header part of an ATM cell to be input from the input transmission line to the active system of the duplexed system and an ACT flag indicating standby to an ATM cell to be input to the ATM switch of the standby system of the duplexed system, a multiplexer section 26 for regulating, for example, a difference in cell transfer rate between the transmission line and the ATM switch as will be described later, a switch section 27, a demultiplexer section 28 for regulating the cell transfer rate as the multiplexer section 26 does, and a selector section 29 for selecting either of outputs of the duplexed ATM switches.

The ACT mark assigner section 25 assigns ACT flags to ATM cells input from the input transmission line in such a way that the "1" flag is set to cells to be input to the active switch in the switch section 27 and the "0" flag is set to cells to be input to the standby switch. Cells which passed through the ATM switches are checked for their ACT flags with the result that only cells to which the one ACT flag has been set are output to the output transmission line via the demultiplexer section 28 and the selector section 29. Thereby, overlap and drop-out of cells can be avoided.

If, in FIG. 13, cells were output in the order in which they were output from the switch section 27, outstripping of cells and so on would occur at the time of switching between systems because of different conditions of buffers in the switch. For this reason, at the time of switching between systems, the input of cells to the old active system is stopped temporarily and the selector section 29 outputs cells from the old active system until all the active indicating cells have passed through the old active system and then the buffers in the switch and the buffers in the demultiplexer section 28 have been vacated. During this period active indicating cells are stored in the buffers of the demultiplexer 28 for the new active system. When all the buffers for the old active system are vacated, the selector section 29 is switched to start to read from the buffers in the demultiplexer section 28 of the new active system. And inputting of ATM cells from the input transmission line to the old active system is resumed.

In FIG. 13, the ACT flag assignment is performed by the ACT mark assigner 25 in a simplexing section which is not duplexed. If the ACT flags were assigned in a duplexing section, there would be the possibility of occurrence of overlap or drop-out of cells in the event of a failure of the flag assignment circuit. At the time of switching between systems, active indicating cells may flow into the switches of both systems, so that even the contents of active cells of both systems are required to be checked and verification of the failure becomes difficult. If the flags are assigned in the simplexing section, it becomes impossible to switch between systems in the event of a failure in the flag assignment circuit. However, the failure can be verified in the succeeding duplexing section. Therefore, the ACT flags are assigned in the simplexing section and they are checked in the duplexing section.

In FIG. 13, the selection of active indicating cells can also be carried out by the cell selector using, for example, TAG information. Standby cells can be discarded there. Only active indicating cells are input to the buffers of the demultiplexer section 28 for regulating the rate of transmission of cells of both systems. The rate-regulating buffer is also used as a buffer for avoiding outstripping of cells and provided in the duplexing section.

Figure 14A:
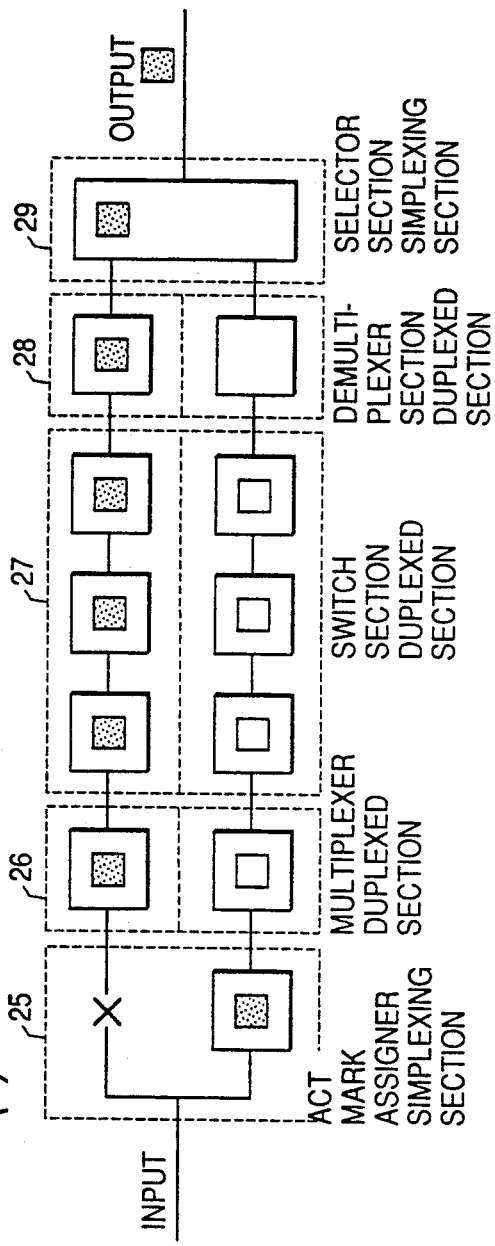

FIG. 14 illustrates the operation at the time of switching between systems in the second embodiment. A description will be made of the operation when the upper system in the second embodiment of FIG. 13 is switched from active to standby and the lower system is switched from standby to active. First, in FIG. 14(a), inputting of ATM cells to the upper system as old active system and ACT flags are set to input cells by the ACT mark assigner 25 for application to the lower system. Thereby, an active indicating cell with a black square mark is input to the lower system and the buffer in the demultiplexer 28 for the lower system is reset, so that it is placed in the state to store only active indicating cells.

Figure 14B:
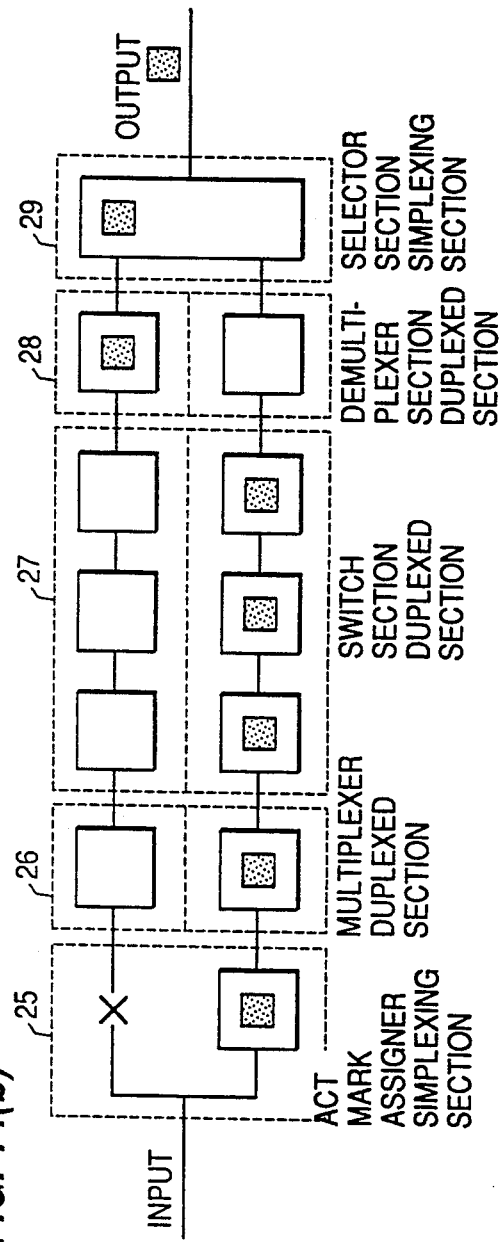

FIGS. 14(b) and (c) illustrate the operation when switching between systems is being made. In FIG. 14 (b), an active indicating cell still remains in the buffer of the demultiplexer 28 of the upper system which is the old active system and the selector 29 outputs the cell from the old active system onto the transmission line. In FIG. 14(c), the active cell in the upper system has disappeared and an active indicating cell has been stored in the buffer in the demultiplexer 28 of the lower system which is a new active system.

In FIG. 14(d), an ATM cell is output from the buffer of the demultiplexer 28 of the new active system onto the output transmission line via the selector 29. At the same time, inputting of ATM cells to which the "0" ACT flag is set to the old active system, i.e., the standby system is resumed. The reason why cells are input to the standby system as well after system switching is to make the systems equal to each other with respect to the extent of congestion of cells at the time of switching between systems and to allow a check of the route in the standby at the time of standby. In FIG. 14, the multiplexer 26 serves to transmit a plurality of low-speed signals from the simplexer simultaneously to the switch section 27, while the demultiplexer 28 serves to convert a high-speed signal from the switch section to low-speed signals to the simplexer.

FIG. 15 is a timing chart of the system switching process in the second embodiment. When a system switching instruction is input from the central processing unit (CPU) of the exchange system, switching of assignment of the ACT flag is made first by the ACT mark assigner, inputting of cells to the old active system is stopped, resetting of the buffers in the demultiplexer in the new active system is performed, and storing of only active indicating cells in the buffers is started. Subsequently, a check is made as to whether or not the buffers of the old active system have been vacated. The selector is switched after they have been vacated.

Figure 16:
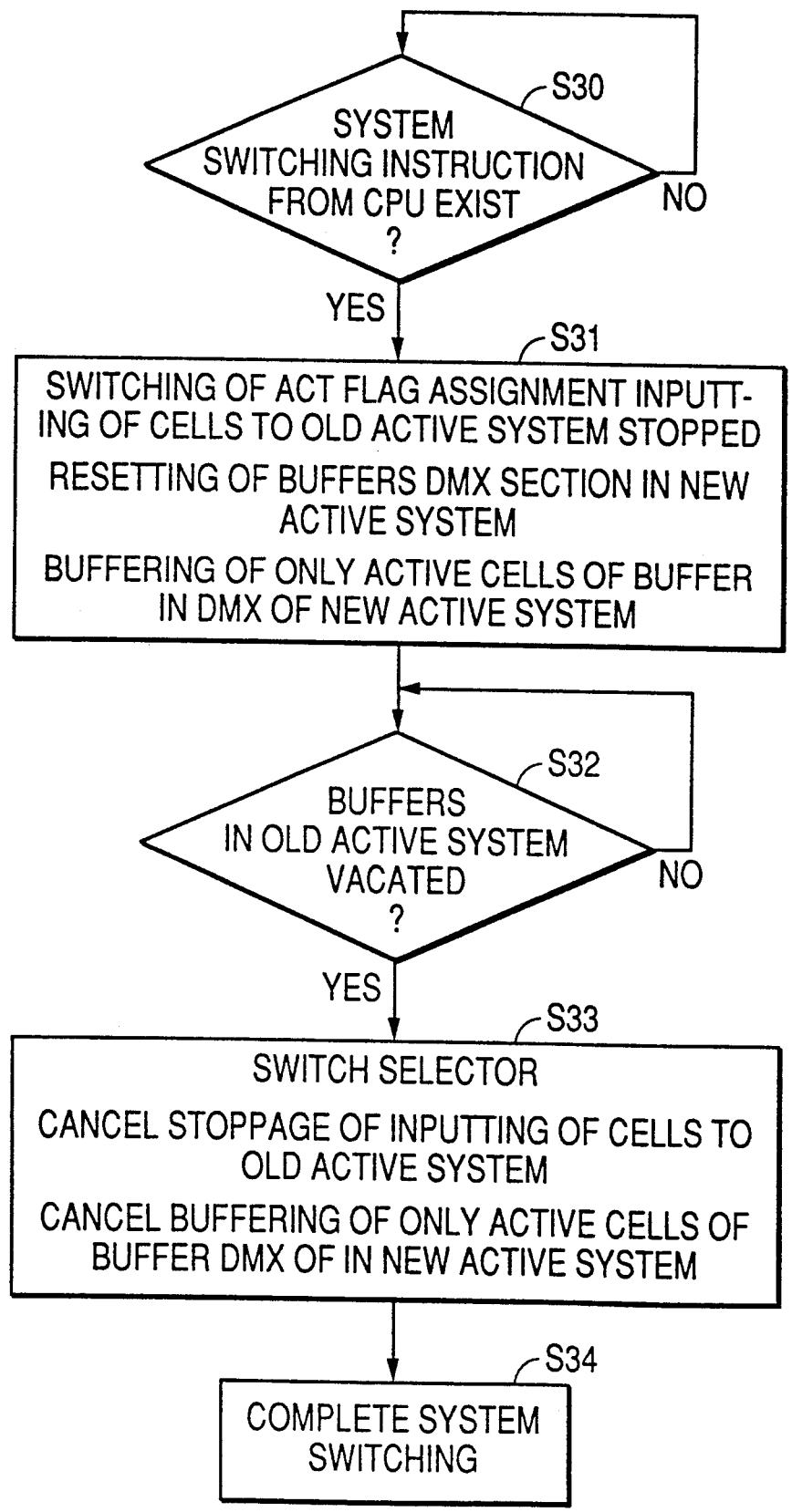
FIG. 16 is a flowchart of the system switching process in the second embodiment.

FIG. 16 is a flowchart of the system switching process in the second embodiment. In the figure, the presence or absence of a system switching instruction from the CPU is monitored in step S30, and when the instruction is present, in S31, switching of ACT flag assignment is performed, inputting of cells to the old active system is stopped, resetting of the buffers in the new active system is performed, and storage of active cells in the new active system is started. A decision is made in S32 as to whether or not the buffers in the old active system have been vacated. After they have been vacated, in S33, the selector is switched, stoppage of inputting of cells to the old active system is canceled, and storage of active cells in the demultiplexer in the new active system is canceled. The system switching is completed in S34.

FIG. 17 illustrates the location of the central processing unit (CPU) of the exchange system in the second embodiment. The CPU 35, as shown, sends #0-system side (upper side) active signals and #1-system side (lower side) active signals to the simplexer via the duplexer.

FIG. 18 illustrates select states of the selector which correspond to active signals from the CPU 35. In the figure, when both the 0-system and 1-system are active or standby, the select state prior to change is held. When one of the systems is active and the other is standby, ATM cells from the active system are selected and output.

In connection with FIGS. 13 through 16, a description was made that the selector 29 is switched when the buffers in the ATM switch in the old active system and the buffers in the demultiplexer 28 are all vacated. For each of the buffers it is calculated from a count value of a write/read counter how far cells fill and it is decided that the buffers are vacated when the amount of use of buffers is zero. The conditions under which the buffers are vacant are detected for each of switch stages and its information is transmitted to the next switch stage like highway information. The next switch stage computes the AND of its buffer vacancy conditions with the buffer vacancy conditions of the preceding stage. If the buffers in both stages are vacant, the vacancy information of the next stage is likewise transmitted. The demultiplexer 28 computes the AND of the vacancy information received together with the highway information with the buffer vacancy conditions of the buffers in the demultiplexer 28 and performs the operation of switching between systems if all the buffers are vacant.

Figure 19:
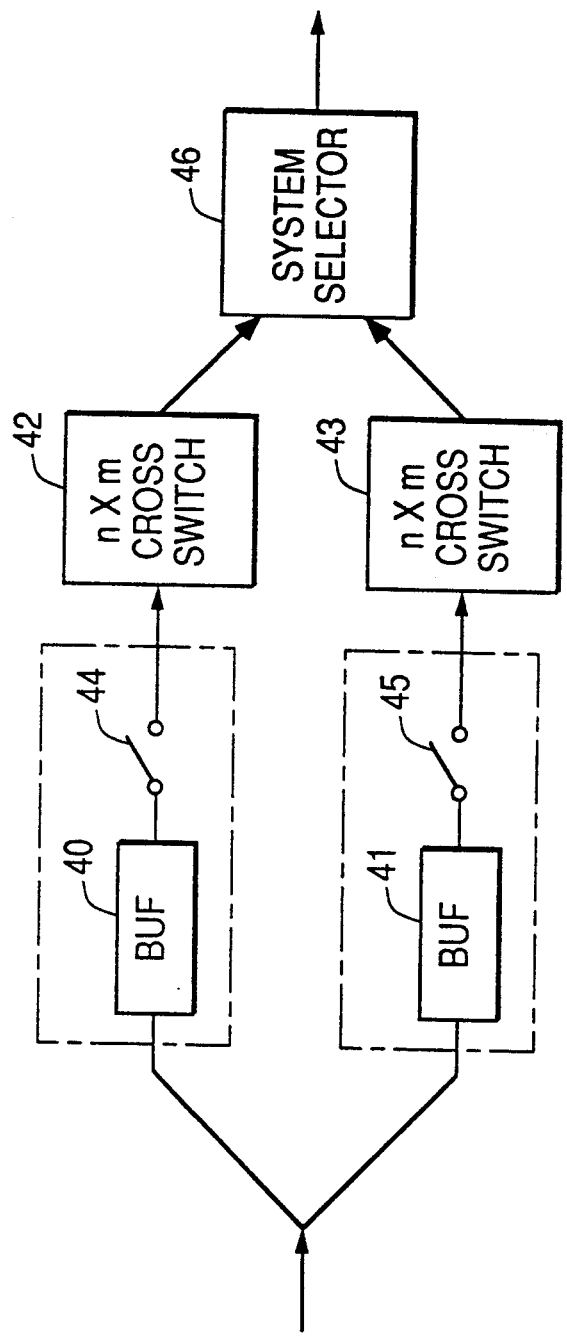
FIG. 19 is a block diagram illustrating a third embodiment of the ATM switch duplexed system.

FIG. 19 is a block diagram of a third embodiment of the ATM switch duplexed system. In the figure, buffers 40 and 41 are provided ahead of ATM switches (n×m cross switches) 42 and 43, respectively. Also, switches 44 and 45 are provided between the buffer 40 and the ATM switch 42 and between the buffer 41 and the ATM switch 43, respectively. Either of outputs of the ATM switches 42 and 43 is selected by a system selector 46 for transmission to a transmission line.

In FIG. 19, the buffers 40 and 41 have the same depth as the ATM switches 42 and 43, and cells are normally input to the cross switches as they are without being stored in the buffers. However, the switches 44 and 45 are opened in switching between the systems and thus outputting of cells from the buffers is stopped, so that input ATM cells are stored in their respective buffers 40 and 41. On the other hand, cells continue to move inside the cross switches and residual cells eventually disappear from the cross switches. At this point of time the system selector 46 is switched to switch between systems and the switches 44 and 45 are closed to cancel the stoppage of cell outputs from the buffers 40 and 41. Thereby, the switching between systems can be carried out with drop-out, overlap and overstripping of cells avoided.

Figure 20:
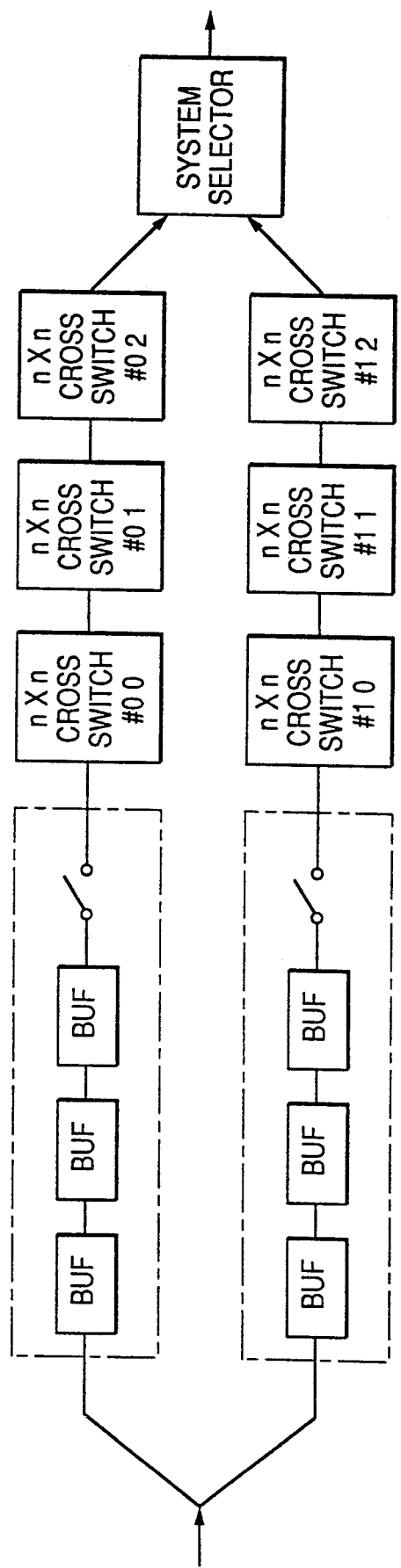
FIG. 20 is a block diagram illustrating a fourth embodiment of the ATM switch duplexed system.

FIG. 20 is a block diagram of a fourth embodiment of the ATM switch duplexed system. In the figure, in each system a plurality of, three herein, cross switches are provided, and buffers which correspond in number to the cross switches are connected in series ahead of the cross switches. That is, three buffers are connected in series because the buffer depth on the cross-switch side is tripled. The operation of this embodiment is the same as that of the third embodiment of FIG. 19.

As described above, the system switching system of the present invention is useful for an exchange system where the ATM switch is duplexed. Also, the present invention is naturally applicable not only to an ATM exchange but also to a general packet exchange.

What is claimed is:

1. A system for switching redundant ATM switches for use in an exchange system between an active ATM switch and a standby ATM switch, comprising:

AI bit inserter means, provided on an input side of said exchange system, for inserting into a header of a cell supplied from an input transmission path to said active ATM switch, an AI bit indicating said active ATM switch and for inserting into the header of a cell supplied form the input transmission path to said standby ATM switch, an AI bit indicating said standby ATM switch;

first and second buffer means, provided on an output side of said exchange system, for storing an ATM cell carrying said AI bit indicating said active ATM switch, outputted from each of said redundant ATM switches;

first and second buffer controller means, corresponding to said first and second buffer means, respectively, for controlling a cell input to said first and second buffer means and for monitoring the presence and absence of data in said first and second buffer means;

selector means for selecting an output from one of said first and second buffer means for transmission to an output transmission path; and selector controller means for controlling a cell output from said selector means.

2. The system according to claim 1, further comprising:

ACT controller means, provided for said AI bit inserter means, for receiving from said active ATM switch and said standby ATM switch a signal for their identification, and for outputting creation information for creating an AI bit.

3. The system according to claim 2, wherein:

said creation information outputted from said ACT controller means instructs a retention of a status before an output when said redundant ATM switches do not include an active ATM switch and a standby ATM switch, and a creation of an AI bit indicating an active ATM switch and an AI bit indicating a standby ATM switch when said redundant ATM switch include an active ATM switch and a standby ATM switch.

4. The system according to claim 1, wherein:

said selector controller means controls a cell output from said selector means to said output transmission path, such that a cell output status of said first and second buffer means is maintained if both of said first and second buffer means store data or both of said first and second buffer means do not store data, and such that when only one of said first and second buffer means stores data that one of said first and second buffer means makes a cell output.

5. The system according to claim 1, wherein:

said AI bit inserter inserts a first value to a free tag data area in said header of a cell supplied to said active ATM switch and a second value to a free area of tag data, for controlling its exchange within an ATM switch, in said header of a cell supplied to said standby ATM switch.

6. A system for switching redundant ATM switches for use in an exchange system between an active ATM switch and a standby ATM switch, comprising:

ACT mark attacher means, provided on an input side of said exchange system, for attaching to a header of a cell supplied to an active ATM switch a bit indicating an active ATM switch and for attaching to the header of a cell supplied to a standby ATM switch a bit indicating a standby ATM switch;

first and second buffer means, respectively provided on an output side of said redundant ATM switches, for storing an ATM cell having a bit indicating an active ATM switch; and selector means for selectively outputting to an output transmission path a cell outputted from either one of said first and second buffer means.

7. The system according to claim 6, wherein:

said selector means, provided on the output side of said exchange system, maintains a status selected before a selection of an output from one of said first and second buffer means when both of said redundant ATM switches are active ATM switches or both of said redundant ATM switches are standby ATM switches, and selects an output from the one of said first and second buffer means of an active ATM switch when one of said first and second buffer means is an active ATM switch and the other one is a standby ATM switch.

8. The system according to claim 6, wherein:

said ACT attacher means switches an active/standby indication bit attachment under system switching instruction by a central processing unit of said exchange system;

a cell input to a heretofore active ATM switch is terminated, after being reset, so that one of said first and second buffer means on the output side of a new active ATM switch stores only a cell having a header indicating an active ATM switch, and a wait is made until one of said first and second buffer means of said heretofore active ATM switch becomes empty; and said selector means is switched to said one of said first and second buffer means of said active ATM switch when a cell input to said heretofore active ATM switch resumes, and a switching of ATM switches is completed.

9. The system according to claim 6, wherein:

said ACT mark attacher means inserts a first value to a free tag data area in said header of a cell supplied to said active ATM switch and a second value to a free tag data area, for controlling its exchange within an ATM switch, in said header of a cell supplied to said standby ATM switch.

* * * * *